(12) United States Patent
Kim et al.

(10) Patent No.: US 11,891,131 B2
(45) Date of Patent: Feb. 6, 2024

(54) VIBRATION REDUCTION APPARATUS AND METHOD OF MOTOR DRIVEN POWER STEERING

(71) Applicant: HYUNDAI MOBIS CO., LTD., Seoul (KR)

(72) Inventors: In Hyuk Kim, Yongin-si (KR); Han Wul Kim, Yongin-si (KR); Kwang Woong Kim, Yongin-si (KR); Kyu Ha Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 231 days.

(21) Appl. No.: 17/525,826

(22) Filed: Nov. 12, 2021

(65) Prior Publication Data

US 2023/0007915 A1 Jan. 12, 2023

(30) Foreign Application Priority Data

Jul. 7, 2021 (KR) .......................... 10-2021-0089026

(51) Int. Cl.
*B62D 5/00* (2006.01)
*B62D 5/04* (2006.01)

(52) U.S. Cl.
CPC ......... *B62D 5/0472* (2013.01); *B62D 5/0481* (2013.01)

(58) Field of Classification Search
CPC ............................. B62D 5/0472; B62D 5/0481
USPC ............................................................ 701/42
See application file for complete search history.

(56) References Cited

U.S. PATENT DOCUMENTS

2017/0174255 A1* 6/2017 Kim ..................... B62D 5/0472

FOREIGN PATENT DOCUMENTS

| DE | 10 2004 007170 | 5/2005 |
| DE | 10 2021 212746 | 6/2013 |
| DE | 10 2014 201397 | 3/2015 |
| DE | 11 2008 002009 | 6/2015 |
| DE | 10 2010 025495 | 10/2015 |
| JP | 2007-237840 | 9/2007 |

(Continued)

OTHER PUBLICATIONS

Korean Office Action dated Jul. 3, 2023 issued in KR 10-2021-0089026.

(Continued)

*Primary Examiner* — Erick R Solis
(74) *Attorney, Agent, or Firm* — DLA PIPER LLP (US)

(57) ABSTRACT

A vibration reduction apparatus of an MDPS may include: an adaptive control module configured to detect an error signal, generated by disturbance, from a torque signal of a torque sensor which senses torque of the MDPS, and generate a compensation signal for compensating for a disturbance signal by using the error signal; and an adaptive filter module configured to generate a filter signal by using the vibration frequency of the disturbance of the MDPS, remove a disturbance component of a current command outputted from an MDPS controller, on the basis of the filter signal, and output a current command in which the disturbance is suppressed. The MDPS controller may generate a final current command on the basis of the compensation signal and the current command in which the disturbance is suppressed, and control a motor of the MDPS according to the final current command.

9 Claims, 7 Drawing Sheets

(56) References Cited

FOREIGN PATENT DOCUMENTS

| JP | 2016-179746 | 10/2016 |
|---|---|---|
| KR | 2017-0067252 | 6/2017 |
| KR | 2017-0078405 | 7/2017 |
| KR | 2017-0135032 | 12/2017 |

OTHER PUBLICATIONS

English Language Abstract of KR 2017-0078405 published Jul. 7, 2017.
Korean Office Action dated Feb. 2, 2023 issued in KR 10-2021-0089026.
English Language Abstract of JP 2007-237840 published Sep. 20, 2007.
English Language Abstract of JP 2016-179746 published Oct. 13, 2016.
English Language Abstract of KR 2017-0135032 published on Dec. 8, 2017.
German Office Action dated Jul. 21, 2022 issued in DE 10 2021 130 891.7.
English Language Abstract of DE 10 2004 007170 published May 19, 2005.
English Language Abstract of DE 10 2010 025495 publsihed Oct. 22, 20215.
English Language Abstract of DE 10 2021 212746 published Jun. 27, 2013.
English Language Abstract of DE 10 2014 201397 published Mar. 19, 2015.
English Language Abstract of DE 11 2008 002009 publsihed Jun. 25, 2015.

\* cited by examiner

VIBRATION REDUCTION APPARATUS AND METHOD OF MOTOR DRIVEN POWER STEERING

CROSS-REFERENCE TO RELATED APPLICATION

This application claims priority from and the benefit of Korean Patent Application No. 10-2021-0089026, filed on Jul. 7, 2021, which is hereby incorporated by reference for all purposes as if set forth herein.

BACKGROUND

Field

Exemplary embodiments of the present disclosure relate to a vibration reduction apparatus and method of an MDPS (Motor Driven Power Steering), and more particularly, to a vibration reduction apparatus and method of an MDPS, which can estimate disturbance applied to the MDPS, and inversely compensate for the disturbance, thereby reducing vibration.

Discussion of the Background

An MDPS determines the traveling condition of a vehicle through a torque sensor for measuring a driver's steering torque inputted to a steering wheel, a steering angle sensor for measuring a steering angle or steering angular velocity of the steering wheel, and a vehicle speed sensor for measuring vehicle speed. As the driver operates the steering wheel, the MDPS provides assist torque through an electric motor on the basis of steering torque applied to a steering shaft.

Various types of vibrations may be generated in a steering apparatus of a vehicle having such an MDPS mounted therein. The vibrations generated in the MDPS may include various vibrations generated in the rotational direction and radial direction of wheels, due to the structure of a vehicle body or mounting system or the imbalance between the wheels, as well as vibration caused by road conditions.

Disturbance of the vehicle is transferred to the MDPS, and acts as one factor to make a driver feel vibration. The disturbance whose frequency varies according to the speed of the vehicle is transferred to the MDPS, and acts as a factor to disturb a control operation of the MDPS. Thus, it is necessary to minimize the vibration applied to the MDPS.

The related art of the present disclosure is disclosed in Korean Patent Application Publication No. 10-2017-0067252 published on Jun. 16, 2017 and entitled "Electric Power Steering Apparatus".

SUMMARY

Various embodiments are directed to a vibration reduction apparatus and method of an MDPS (Motor Driven Power Steering), which can estimate disturbance applied to the MDPS, and inversely compensate for the disturbance, thereby reducing vibration.

In an embodiment, a vibration reduction apparatus of an MDPS may include: an adaptive control module configured to detect an error signal, generated by disturbance, from a torque signal of a torque sensor which senses torque of the MDPS, and generate a compensation signal for compensating for a disturbance signal by using the error signal; and an adaptive filter module configured to generate a filter signal by using the vibration frequency of the disturbance of the MDPS, remove a disturbance component of a current command outputted from an MDPS controller, on the basis of the filter signal, and output a current command in which the disturbance is suppressed. The MDPS controller may generate a final current command on the basis of the compensation signal and the current command in which the disturbance is suppressed, and control a motor of the MDPS according to the final current command.

The adaptive control module may include: an error signal detection unit configured to detect the error signal from the torque signal; and a compensation signal generation unit configured to generate a basic function by using the vibration frequency of the disturbance, generate the compensation signal by using the basic function, and then adjust the compensation signal for offsetting the disturbance signal, according to the error signal.

The error signal detection unit may include: a band pass filter configured to output the error signal by filtering the torque signal; and a center frequency setting unit configured to set the center frequency of the band pass filter according to the vibration frequency of the disturbance.

The compensation signal generation unit may include: a compensation signal detection unit configured to generate a turn angle by integrating the vibration frequency of the disturbance, generate a basic function based on the turn angle, and detect the compensation signal through the basic function; and a compensation signal adjusting unit configured to adjust a parameter for deciding the magnitude and phase of the compensation signal, such that the magnitude of the error signal is decreased.

The adaptive filter module may include: a filter signal detection unit configured to generate a turn angle by integrating the vibration frequency of the disturbance, generate a basic function based on the turn angle, and detect a filter signal through the basic function; and a filter signal adjusting unit configured to adjust a parameter for deciding the magnitude and phase of the filter signal, in order to reduce an error between the current command and the filter signal.

In an embodiment, a vibration reduction method of an MDPS may include: detecting, by an adaptive control module, an error signal, generated by disturbance, from a torque signal of a torque sensor which senses torque of the MDPS, and generating a compensation signal for compensating for a disturbance signal by using the error signal; generating, by an adaptive filter module, a filter signal by using the vibration frequency of disturbance of the MDPS, removing a disturbance component of a current command outputted from an MDPS controller on the basis of the filter signal, and outputting a current command in which the disturbance is suppressed; and generating, by the MDPS controller, a final current command on the basis of the compensation signal and the current command in which the disturbance is suppressed, and controlling a motor of the MDPS according to the final current command.

The generating of the compensation signal may include: detecting the error signal from the torque signal; and generating a basic function by using the vibration frequency of the disturbance, generating the compensation signal by using the basic function, and then adjusting the compensation signal for offsetting the disturbance signal, according to the error signal.

The generating of the compensation signal may include: generating a turn angle by integrating the vibration frequency of the disturbance, generating a basic function based on the turn angle, and detecting the compensation signal through the basic function; and adjusting a parameter for deciding the magnitude and phase of the compensation signal, such that the magnitude of the error signal is decreased.

The outputting of the current command may include: generating a turn angle by integrating the vibration frequency of the disturbance, generating a basic function based on the turn angle, and detecting a filter signal through the basic function; and adjusting a parameter for deciding the magnitude and phase of the filter signal, in order to reduce an error between the current command and the filter signal.

In accordance with the embodiment of the present disclosure, the vibration reduction apparatus and method of the MDPS may estimate variable frequency disturbance applied to the MDPS, and inversely compensate for the disturbance, thereby reducing vibration.

Furthermore, the vibration reduction apparatus and method of the MDPS may reduce the vibration of the steering wheel through a simple numerical calculation without existing dynamic modeling.

DETAILED DESCRIPTION OF THE ILLUSTRATED EMBODIMENTS

Hereinafter, a vibration reduction apparatus and method of an MDPS (Motor Driven Power Steering) will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
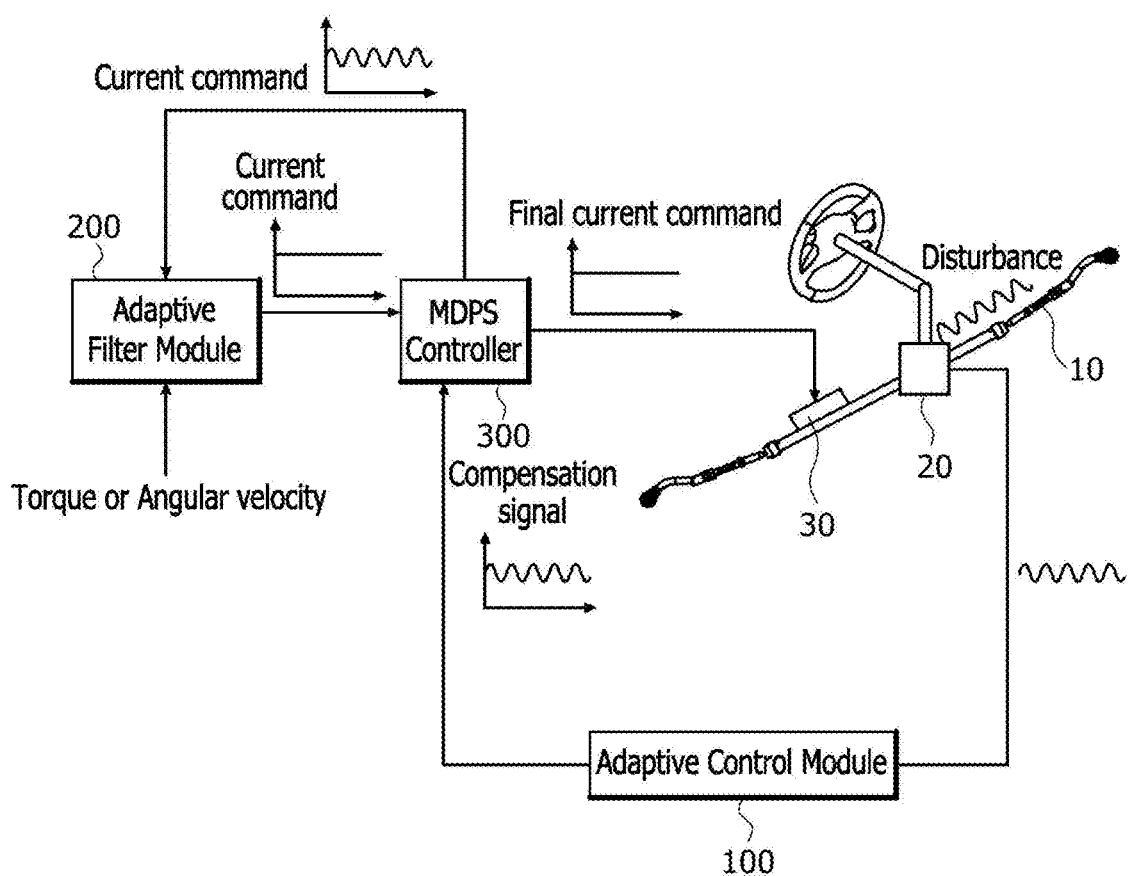
FIG. 1 is a block configuration diagram illustrating a vibration reduction apparatus of an MDPS in accordance with an embodiment of the present disclosure.
Figure 2:
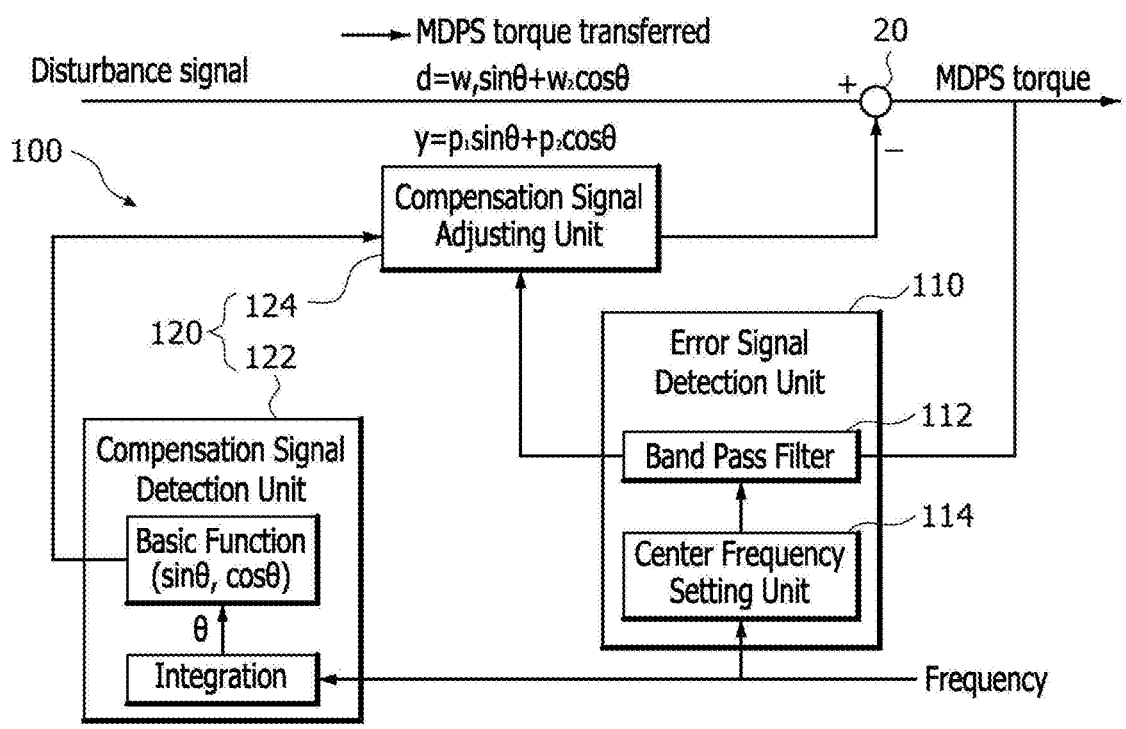
FIG. 2 is a block configuration diagram illustrating an adaptive control module of FIG. 1.
Figure 3:
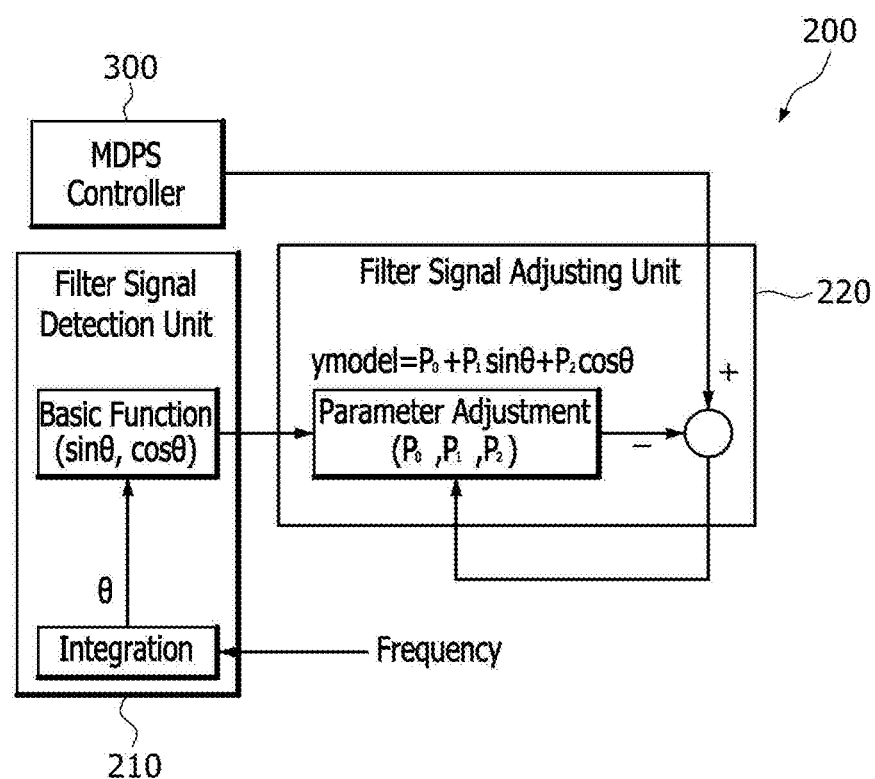
FIG. 3 is a block configuration diagram illustrating an adaptive filter module of FIG. 1.
Figure 4:
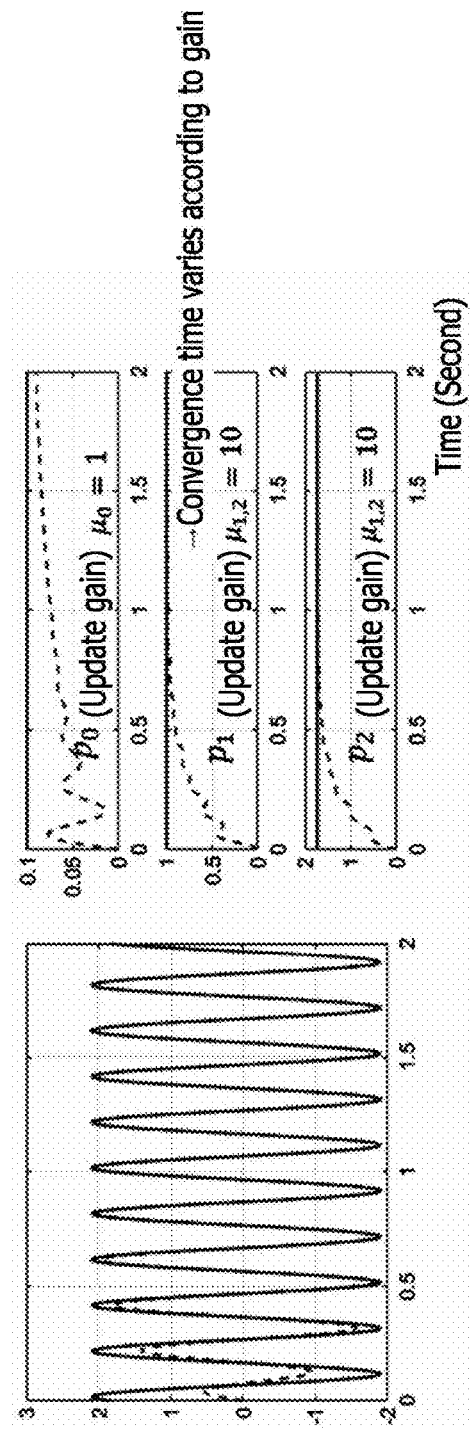
FIG. 4 is a diagram illustrating an example in which parameters converge according to a simulation result in accordance with the embodiment of the present disclosure.
Figure 5:
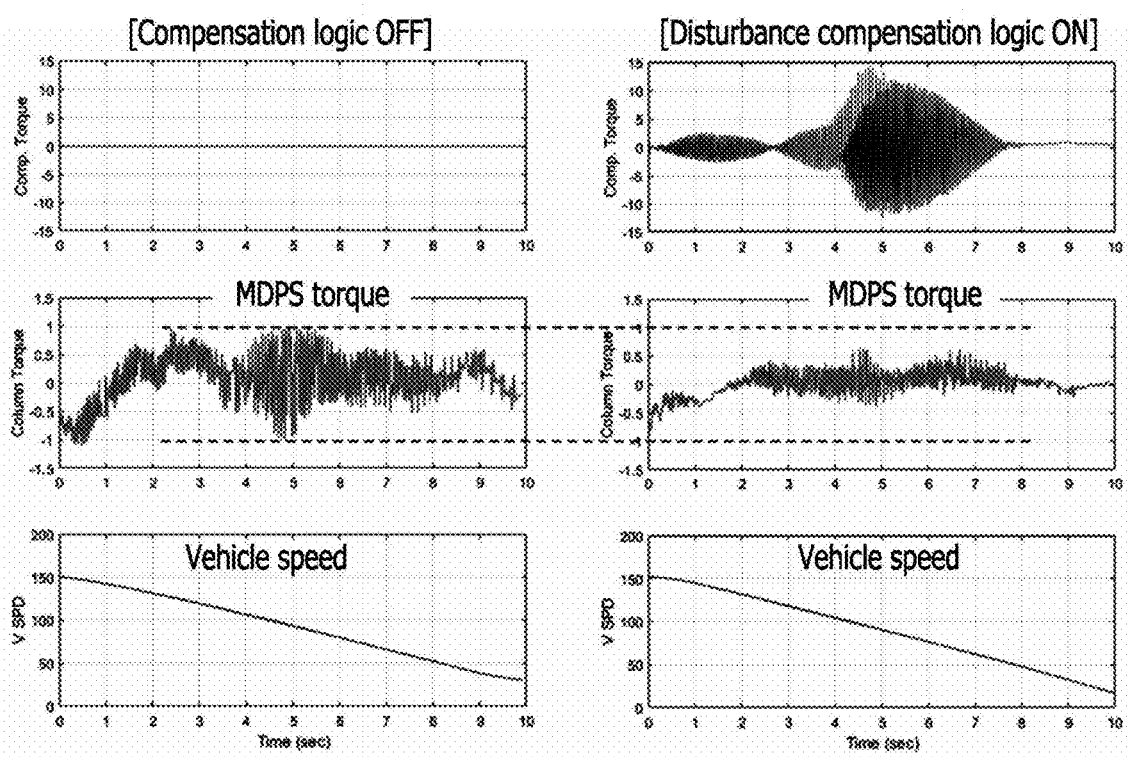
FIG. 5 is a diagram illustrating a compensation logic test result (time data) using an actual vehicle in accordance with the embodiment of the present disclosure.
Figure 6:
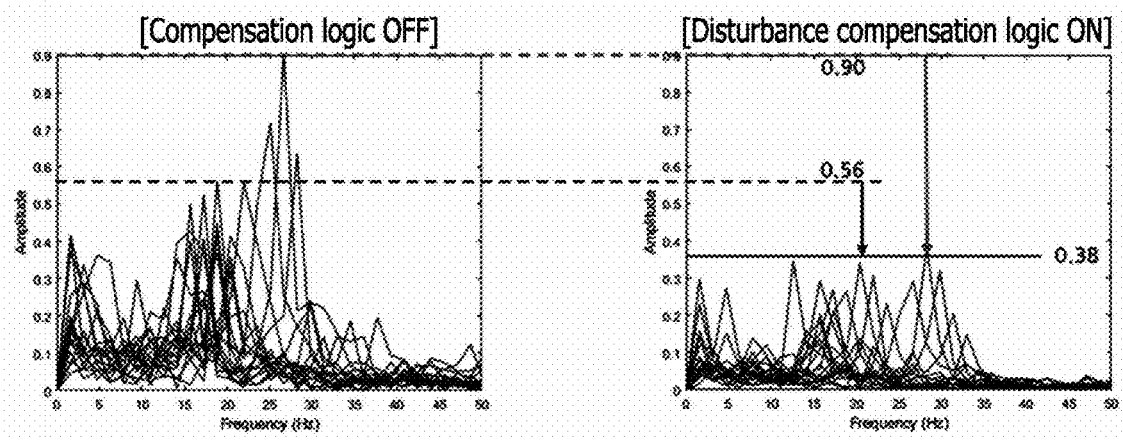
FIG. 6 is a diagram illustrating a compensation logic test result (frequency analysis) using an actual vehicle in accordance with the embodiment of the present disclosure.

FIG. 1 is a block configuration diagram illustrating a vibration reduction apparatus of an MDPS in accordance with an embodiment of the present disclosure, FIG. 2 is a block configuration diagram illustrating an adaptive control module of FIG. 1, FIG. 3 is a block configuration diagram illustrating an adaptive filter module of FIG. 1, FIG. 4 is a diagram illustrating an example in which parameters converge according to a simulation result in accordance with the embodiment of the present disclosure, FIG. 5 is a diagram illustrating a compensation logic test result (time data) using an actual vehicle in accordance with the embodiment of the present disclosure, and FIG. 6 is a diagram illustrating a compensation logic test result (frequency analysis) using an actual vehicle in accordance with the embodiment of the present disclosure.

Referring to FIGS. 1 to 3, the vibration reduction apparatus of an MDPS in accordance with the embodiment of the present disclosure includes an adaptive control module 100, an adaptive filter module 200 and an MDPS controller 300.

The MDPS determines the traveling condition of a vehicle through a torque sensor 20 for measuring a driver's steering torque inputted to a steering wheel, a steering angle sensor (not illustrated) for measuring a steering angle or steering angular velocity of the steering wheel, and a vehicle speed sensor for measuring vehicle speed. As the driver operates the steering wheel, the MDPS provides assist torque through an electric motor on the basis of steering torque applied to a steering shaft.

During this process, the MDPS may be affected by vibration caused by the resonance of the vehicle, and a current command of the MDPS may also be affected by the vibration. That is, a current command for motor control of the MDPS, which is provided from the MDPS controller 300 of the MDPS, may also contain a disturbance component.

The adaptive control module 100 detects an error signal, generated by the disturbance, from a torque signal of the torque sensor 20 which senses steering torque of the MDPS. The adaptive control module 100 generates a compensation signal for compensating for the disturbance signal by using the detected error signal.

The torque signal sensed by the torque sensor 20 may include driver torque, measurement noise, disturbance torque and compensation torque. In particular, the disturbance torque may be included in the torque signal by vibration of a rack bar 10.

Referring to FIG. 2, the adaptive control module 100 includes an error signal detection unit 110 and a compensation signal generation unit 120.

The error signal detection unit 110 detects the error signal from the torque signal outputted from the torque sensor 20.

The error signal detection unit 110 includes a band pass filter 112 and a center frequency setting unit 114.

The band pass filter 112 outputs the error signal from the torque signal by filtering the torque signal sensed by the torque sensor 20. The torque signal sensed by the torque sensor 20 includes a disturbance component.

The center frequency setting unit 114 detects the vibration frequency of a wheel by the disturbance, and sets the center frequency of the band pass filter 112 to the vibration frequency of the wheel. The vibration frequency may be calculated from the speed of the vehicle and the angular velocity of a motor 30.

In this case, according to the center frequency set by the center frequency setting unit 114, the band pass filter 112 may filter the frequency of the corresponding band, thereby detecting the error signal caused by the disturbance component.

The compensation signal generation unit 120 generates a basic function of the compensation signal by using the vibration frequency of the disturbance, generates the compensation signal by using the generated basic function, and adjusts the compensation signal in order to offset the disturbance signal according to the generated error signal.

The compensation signal generation unit 120 includes a compensation signal detection unit 122 and a compensation signal adjusting unit 124.

The compensation signal detection unit 122 generates a turn angle θ by integrating the vibration frequency of the disturbance.

The compensation signal detection unit 122 generates the basic function (sin θ, cos θ) of the compensation signal by using the generated turn angle θ.

The compensation signal detection unit 122 detects the compensation signal (y=p1 sin θ+p2 cos θ) by using the generated basic function.

In the compensation signal, p1 and p2 represent parameters for deciding the magnitude and phase of the compensation signal.

The compensation signal adjusting unit 124 adjusts the parameters for deciding the magnitude and phase of the compensation signal, such that the magnitude of the error signal is decreased.

That is, the compensation signal adjusting unit 124 controls the magnitude of the error signal to be decreased by adjusting the parameters of the compensation signal according to the error signal, thereby removing the disturbance signal (d=w1 sin θ+w2 cos θ).

The compensation signal adjusted by the compensation signal adjusting unit 124 is transferred to a compensation signal transfer system, and converted into torque of the MDPS system. The compensation signal transfer system may include all electronic and mechanical parts such as the MDPS controller 300, the motor 30, a motor controller and a gear, as long as the parts are used to generate torque, and is not specifically limited.

The steering torque generated by the compensation signal transfer system may be sensed by the torque sensor 20, and the torque signal sensed by the torque sensor 20 may be used to compensate for the disturbance of the torque sensor 20.

The adaptive filter module 200 generates a filter signal by using the vibration frequency of the disturbance of the MDPS, removes the disturbance component of the current command outputted from the MDPS controller 300 on the basis of the filter signal, and outputs the current command in which the disturbance is suppressed.

Referring to FIG. 3, the adaptive filter module 200 includes a filter signal detection unit 210 and a filter signal adjusting unit 220.

The filter signal detection unit 210 generates a turn angle θ by integrating the vibration frequency of the disturbance. The filter signal detection unit 210 generates the basic function (sin θ, cos θ) of the filter signal by using the generated turn angle θ.

The filter signal detection unit 210 detects the filter signal ($y_{model}$=p0+p1 sin θ+p2 cos θ) by using the generated basic function.

In the filter signal, p0, p1, and p2 represent parameters for deciding the magnitude and phase of the filter signal.

The filter signal adjusting unit 220 adjusts the parameters for deciding the magnitude and phase of the filter signal, thereby reducing an error between the filter signal and the current command of the MDPS controller 300.

That is, the filter signal adjusting unit 220 receives the current command from the MDPS controller 300. The filter signal adjusting unit 220 detects an error by comparing the current command received from the MDPS controller 300 to the filter signal detected by the filter signal detection unit 210.

The error corresponds to a value obtained by subtracting the filter signal detected by the filter signal detection unit 210 from the current command received from the MDPS controller 300.

As the error is detected, the filter signal adjusting unit 220 adjusts the parameters p0, p1 and p2 to reduce the magnitude of the error.

The filter signal adjusting unit 220 adjusts the parameters p0, p1 and p2 to remove the disturbance signal (p1 sin θ+p2 cos θ) within the filter signal. When only the parameter p0 is independently corrected, it is difficult to distinguish between the disturbance signal and the other signals which are not the disturbance signal, thereby making it difficult to remove only the disturbance signal. Thus, the filter signal adjusting unit 220 removes the disturbance signal by adjusting the parameters p0, p1 and p2.

As the disturbance signal (p1 sin θ+p2 cos θ) is removed by the filter signal adjusting unit 220, the current command outputted by the filter signal adjusting unit 220 is p0. At this time, p0 is a low-frequency smooth signal.

That is, the filter signal adjusting unit 220 generates the filter signal from which the disturbance signal is removed, i.e. the current command in which the disturbance is suppressed, and inputs the generated current command to the MDPS controller 300.

The MDPS controller 300 receives the compensation signal inputted from the adaptive control module 100, receives the current command, in which the disturbance is suppressed, from the adaptive filter module 200, and generates a final current command on the basis of the compensation signal and the current command in which the disturbance is suppressed. The MDPS controller 300 controls the motor 30 of the MDPS according to the generated final current command.

Referring to FIG. 4 showing a simulation result of the vibration reduction apparatus of the MDPS in accordance with the embodiment of the present disclosure, the parameters p0, p1 and p2 converge to target parameters of 0.1, 1.0 and $\sqrt{3}$, respectively. At this time, the convergence time may be changed according to the magnitude of an update gain.

FIG. 5 illustrates a test result using an actual vehicle. The test condition is where the vehicle speed is 150 km/h, and the vibration frequency of the disturbance ranges from 30 Hz to 10 Hz.

FIG. 5 comparatively illustrates the state in which the compensation logic of the vibration reduction apparatus of the MDPS is turned off and the state in which the compensation logic thereof is turned on. Referring to FIG. 5, the MDPS torque in the state in which the compensation logic is turned on is larger than that in the state in which the compensation logic is turned off.

That is, while the compensation logic is turned on, the compensation signal is increased to suppress the disturbance signal included in the steering torque of the MDPS. As a result, the MDPS torque in the state in which the compensation logic is turned on becomes larger than that in the state in which the compensation logic is turned off.

FIG. 6 illustrates a test result using an actual vehicle. The test condition is where the vehicle speed is 150 km/h, and the vibration frequency of the disturbance ranges from 30 Hz to 10 Hz.

FIG. 6 shows that the magnitude of vibration in the state where the compensation logic is turned on is reduced by a maximum of 60%, compared to that in the state where the compensation logic is turned off.

As such, the vibration reduction apparatus of the MDPS in accordance with the embodiment of the present disclosure may define an error signal even without dynamic modeling, and reduce vibration of the steering wheel only through measurement.

Hereafter, a vibration reduction method of an MDPS in accordance with an embodiment of the present disclosure will be described in detail with reference to FIG. 7.

Figure 7:
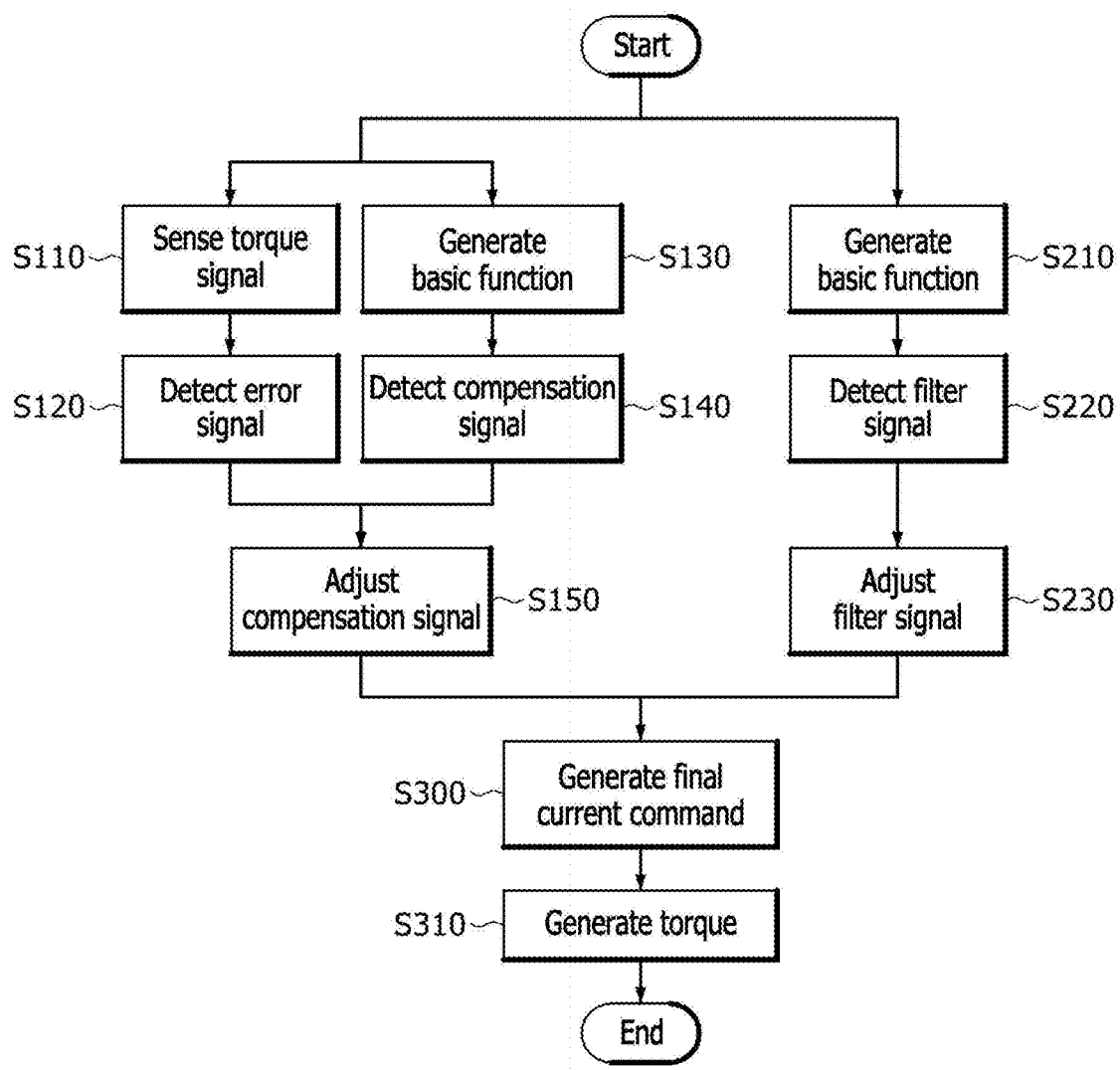
FIG. 7 is a flowchart illustrating a vibration reduction method of an MDPS in accordance with an embodiment of the present disclosure.

FIG. 7 is a flowchart illustrating a vibration reduction method of an MDPS in accordance with an embodiment of the present disclosure.

Referring to FIG. 7, the torque sensor 20 senses an MDPS torque signal in step S110.

The error signal detection unit 110 detects an error signal from the torque signal outputted from the torque sensor 20, in step S120. In this case, the center frequency setting unit 114 detects the vibration frequency of a wheel by disturbance, and sets the center frequency of the band pass filter 112 to the vibration frequency of the wheel. The band pass filter 112 outputs the error signal from the torque signal by filtering the torque signal sensed by the torque sensor 20.

The compensation signal detection unit 122 generates a turn angle θ by integrating the vibration frequency of disturbance, and generates the basic function (sin θ, cos θ) of the compensation signal by using the generated turn angle θ, in step S130.

Furthermore, the compensation signal detection unit 122 detects the compensation signal (y=p1 sin θ+p2 cos θ) by using the generated basic function, in step S140.

In this case, the compensation signal adjusting unit 124 adjusts the parameters p1 and p2 for deciding the magnitude and phase of the compensation signal, such that the magnitude of the error signal is decreased, in step S150.

The filter signal detection unit 210 generates a turn angle θ by integrating the vibration frequency of disturbance, and generates the basic function (sin θ, cos θ) of a filter signal by using the generated turn angle θ, in step S210.

The filter signal detection unit 210 detects the filter signal ($y_{model}$=p0+p1 sin θ+p2 cos θ) by using the generated basic function, in step S220.

Then, the filter signal adjusting unit 220 adjusts the parameters for deciding the magnitude and phase of the filter signal, thereby reducing an error between the filter signal and the current command of the MDPS controller 300, in step S230.

That is, the filter signal adjusting unit 220 detects an error by comparing the current command received from the MDPS controller 300 to the filter signal detected by the filter signal detection unit 210, and adjusts the parameters p0, p1 and p2 to reduce the magnitude of the detected error.

Then, the MDPS controller 300 receives the compensation signal inputted from the adaptive control module 100, receives the current command, in which the disturbance is suppressed, from the adaptive filter module 200, and generates a final current command on the basis of the compensation signal and the current command in which the disturbance is suppressed, in step S300.

The MDPS controller 300 generates torque by controlling the motor 30 of the MDPS according to the generated final current command, in step S310.

As such, the vibration reduction apparatus and method of the MDPS in accordance with the embodiment of the present disclosure may estimate variable frequency disturbance applied to the MDPS, and inversely compensate for the disturbance, thereby reducing vibration.

Furthermore, the vibration reduction apparatus and method of the MDPS in accordance with the embodiment of the present disclosure may reduce the vibration of the steering wheel through a simple numerical calculation without existing dynamic modeling.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A vibration reduction apparatus of an MDPS (Motor Driven Power Steering), comprising:
   an adaptive control module configured to detect an error signal, generated by disturbance, from a torque signal of a torque sensor which senses torque of the MDPS, and generate a compensation signal for compensating for a disturbance signal by using the error signal; and
   an adaptive filter module configured to generate a filter signal by using a vibration frequency of the disturbance of the MDPS, remove a disturbance component of a current command outputted from an MDPS controller, on a basis of the filter signal, and output a current command in which the disturbance is suppressed,
   wherein the MDPS controller generates a final current command on the basis of the compensation signal and the current command in which the disturbance is suppressed, and controls a motor of the MDPS according to the final current command.

2. The vibration reduction apparatus of claim 1, wherein the adaptive control module comprises:
   an error signal detection unit configured to detect the error signal from the torque signal; and
   a compensation signal generation unit configured to generate a basic function by using the vibration frequency of the disturbance, generate the compensation signal by using the basic function, and then adjust the compensation signal for offsetting the disturbance signal, according to the error signal.

3. The vibration reduction apparatus of claim 2, wherein the error signal detection unit comprises:
   a band pass filter configured to output the error signal by filtering the torque signal; and
   a center frequency setting unit configured to set the center frequency of the band pass filter according to the vibration frequency of the disturbance.

4. The vibration reduction apparatus of claim 2, wherein the compensation signal generation unit comprises:
   a compensation signal detection unit configured to generate a turn angle by integrating the vibration frequency of the disturbance, generate a basic function based on the turn angle, and detect the compensation signal through the basic function; and
   a compensation signal adjusting unit configured to adjust a parameter for deciding a magnitude and phase of the compensation signal, such that the magnitude of the error signal is decreased.

5. The vibration reduction apparatus of claim 1, wherein the adaptive filter module comprises:
   a filter signal detection unit configured to generate a turn angle by integrating the vibration frequency of the disturbance, generate a basic function based on the turn angle, and detect a filter signal through the basic function; and
   a filter signal adjusting unit configured to adjust a parameter for deciding a magnitude and phase of the filter signal, in order to reduce an error between the current command and the filter signal.

6. A vibration reduction method of an MDPS, comprising:
   detecting, by an adaptive control module, an error signal, generated by disturbance, from a torque signal of a torque sensor which senses torque of the MDPS, and generating a compensation signal for compensating for a disturbance signal by using the error signal;
   generating, by an adaptive filter module, a filter signal by using a vibration frequency of the disturbance of the MDPS, removing a disturbance component of a current command outputted from an MDPS controller on a basis of the filter signal, and outputting the current command in which the disturbance is suppressed; and
   generating, by the MDPS controller, a final current command on a basis of the compensation signal and the current command in which the disturbance is suppressed, and controlling a motor of the MDPS according to the final current command.

7. The vibration reduction method of claim 6, wherein the generating of the compensation signal comprises:
   detecting the error signal from the torque signal; and
   generating a basic function by using the vibration frequency of the disturbance, generating the compensation signal by using the basic function, and then adjusting the compensation signal for offsetting the disturbance signal, according to the error signal.

8. The vibration reduction method of claim 7, wherein the generating of the compensation signal comprises:
   generating a turn angle by integrating the vibration frequency of the disturbance, generating a basic function based on the turn angle, and detecting the compensation signal through the basic function; and
   adjusting a parameter for deciding a magnitude and phase of the compensation signal, such that the magnitude of the error signal is decreased.

9. The vibration reduction method of claim 6, wherein the outputting of the current command comprises:
   generating a turn angle by integrating the vibration frequency of the disturbance, generating a basic function based on the turn angle, and detecting a filter signal through the basic function; and
   adjusting a parameter for deciding a magnitude and phase of the filter signal, in order to reduce an error between the current command and the filter signal.

* * * * *